(12) United States Patent
Greene

(10) Patent No.: US 10,905,194 B2
(45) Date of Patent: Feb. 2, 2021

(54) SOLE STRUCTURE FOR AN ARTICLE OF FOOTWEAR HAVING A BLADDER ELEMENT WITH LATERALLY EXTENDING TUBES AND METHOD OF MANUFACTURING A SOLE STRUCTURE

(71) Applicant: NIKE, Inc., Beaverton, OR (US)

(72) Inventor: Pamela S. Greene, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 32 days.

(21) Appl. No.: 15/770,666

(22) PCT Filed: Nov. 2, 2016

(86) PCT No.: PCT/US2016/060066
§ 371 (c)(1),
(2) Date: Apr. 24, 2018

(87) PCT Pub. No.: WO2017/079255
PCT Pub. Date: May 11, 2017

(65) Prior Publication Data
US 2018/0303201 A1    Oct. 25, 2018

Related U.S. Application Data

(60) Provisional application No. 62/250,216, filed on Nov. 3, 2015.

(51) Int. Cl.
*A43B 13/20* (2006.01)
(52) U.S. Cl.
CPC ............ *A43B 13/206* (2013.01); *A43B 13/20* (2013.01); *A43B 13/203* (2013.01)

(58) Field of Classification Search
CPC ....... A43B 13/04; A43B 13/14; A43B 13/186; A43B 13/188; A43B 13/20; A43B 13/203;
(Continued)

(56) References Cited

U.S. PATENT DOCUMENTS

| 896,075 A | 8/1908 | Badgley |
| 1,498,838 A | 6/1924 | Harrison, Jr. |

(Continued)

FOREIGN PATENT DOCUMENTS

| CN | 101677652 A | 3/2010 |
| CN | 104203029 A | 12/2014 |

(Continued)

OTHER PUBLICATIONS solereview.com Product Review, "Nike Air Max 2014 Review", May 28, 2014, 18 pps., http://www.solereview.com/nike-air-max-2014-review/, printed Mar. 23, 2015.

*Primary Examiner* — Heather Mangine
(74) *Attorney, Agent, or Firm* — Quinn IP Law

(57) ABSTRACT

An article of footwear is disclosed that includes a sole structure having a bladder element. The bladder element includes multiple fluid-filled tubes that are substantially decoupled from one another along their respective lengths. The tubes extend lengthwise at least partially from a lateral extremity of the sole structure to a medial extremity of the sole structure. A method of manufacturing a sole structure of an article of footwear includes forming a bladder element with multiple tubes substantially decoupled from one another along their respective lengths. The method includes positioning the bladder element so that the tubes extend lengthwise at least partially from a lateral extremity of the sole structure to a medial extremity of the sole structure.

15 Claims, 5 Drawing Sheets

(58) Field of Classification Search
CPC ..... A43B 13/206; A43B 13/40; A43B 1/0063;
A43B 5/00; A43B 13/189; B65D 81/052;
B65D 81/03
USPC ................................................ 36/153, 35 B
See application file for complete search history.

(56) References Cited

U.S. PATENT DOCUMENTS

| | | | |
|---|---|---|---|
| 1,771,793 A | 7/1930 | Kind | |
| D164,456 S | 9/1951 | Sprigg | |
| D164,457 S | 9/1951 | Sprigg | |
| 4,123,855 A | 11/1978 | Thedford | |
| 4,183,156 A | 1/1980 | Rudy | |
| 4,219,945 A | 9/1980 | Rudy | |
| 4,523,393 A | 6/1985 | Inohara | |
| 4,934,071 A | 6/1990 | Virgini | |
| 4,936,029 A | 6/1990 | Rudy | |
| 5,042,176 A | 8/1991 | Rudy | |
| 5,195,257 A | 3/1993 | Holcomb et al. | |
| 5,353,459 A * | 10/1994 | Potter | A43B 13/206 |
| | | | 12/146 R |
| 5,353,523 A | 10/1994 | Kilgore et al. | |
| D376,897 S | 12/1996 | Passke et al. | |
| D376,898 S | 12/1996 | Passke et al. | |
| D376,899 S | 12/1996 | Passke et al. | |
| D377,110 S | 1/1997 | Passke et al. | |
| D377,111 S | 1/1997 | Passke et al. | |
| D377,112 S | 1/1997 | Passke et al. | |
| D377,113 S | 1/1997 | Passke et al. | |
| D377,559 S | 1/1997 | Passke et al. | |
| 5,598,645 A | 2/1997 | Kaiser | |
| D378,629 S * | 4/1997 | Passke | D2/961 |
| 5,625,964 A * | 5/1997 | Lyden | A43B 13/20 |
| | | | 36/114 |
| 5,669,161 A | 9/1997 | Huang | |
| D385,394 S | 10/1997 | Passke et al. | |
| D386,289 S | 11/1997 | Passke et al. | |
| D386,290 S | 11/1997 | Passke et al. | |
| D386,894 S | 12/1997 | Passke et al. | |
| 5,704,137 A * | 1/1998 | Dean | A43B 13/206 |
| | | | 36/28 |
| 5,713,141 A | 2/1998 | Mitchell et al. | |
| D411,912 S | 7/1999 | Van Noy et al. | |
| 5,933,983 A | 8/1999 | Jeon | |
| 5,952,065 A | 9/1999 | Mitchell et al. | |
| 6,013,340 A | 1/2000 | Bonk et al. | |
| 6,082,025 A | 7/2000 | Bonk et al. | |
| 6,127,026 A * | 10/2000 | Bonk | A43B 13/20 |
| | | | 428/213 |
| 6,203,868 B1 | 3/2001 | Bonk et al. | |
| 6,321,465 B1 | 11/2001 | Bonk et al. | |
| 6,385,864 B1 | 5/2002 | Sell, Jr. et al. | |
| 6,463,612 B1 | 10/2002 | Potter | |
| 6,749,187 B2 | 6/2004 | Yang | |
| 6,880,267 B2 | 4/2005 | Smaldone et al. | |
| 7,013,581 B2 | 3/2006 | Greene et al. | |
| 7,076,891 B2 | 7/2006 | Goodwin | |
| 7,244,483 B2 | 7/2007 | Tawney et al. | |
| D547,932 S | 8/2007 | Loverin | |
| 7,448,150 B1 * | 11/2008 | Davis | A43B 13/203 |
| | | | 36/153 |
| 7,451,555 B1 | 11/2008 | Lakic | |
| 7,707,744 B2 | 5/2010 | Schindler et al. | |
| 7,810,256 B2 | 10/2010 | Goodwin et al. | |
| 7,937,856 B2 | 5/2011 | Cook et al. | |
| 8,850,718 B2 | 10/2014 | Lubart | |
| D719,335 S | 12/2014 | Lindner et al. | |
| 8,961,844 B2 | 2/2015 | Baghdadi et al. | |
| 2002/0035794 A1 | 3/2002 | Doyle | |
| 2002/0050077 A1 | 5/2002 | Wang et al. | |
| 2006/0272179 A1 | 12/2006 | Passke et al. | |
| 2007/0074423 A1 | 4/2007 | Goodwin et al. | |
| 2007/0107266 A1 | 5/2007 | Sun | |
| 2011/0138654 A1 | 6/2011 | Cook et al. | |
| 2012/0174432 A1 | 7/2012 | Peyton | |
| 2012/0233885 A1 | 9/2012 | Shaffer et al. | |
| 2012/0291313 A1 | 11/2012 | Peyton et al. | |
| 2012/0304501 A1 | 12/2012 | Song | |
| 2013/0167401 A1 | 7/2013 | Christensen et al. | |
| 2013/0212909 A1 * | 8/2013 | Bates | A43B 13/188 |
| | | | 36/102 |
| 2013/0227858 A1 | 9/2013 | James | |
| 2013/0276329 A1 * | 10/2013 | James | A43B 13/189 |
| | | | 36/83 |
| 2014/0020264 A1 | 1/2014 | Holt | |
| 2014/0182167 A1 | 7/2014 | James et al. | |
| 2014/0215849 A1 | 8/2014 | Litchfield et al. | |
| 2014/0230276 A1 * | 8/2014 | Campos, II | B29D 35/122 |
| | | | 36/84 |
| 2014/0250726 A1 | 9/2014 | Meschter | |
| 2014/0283413 A1 | 9/2014 | Christensen et al. | |
| 2014/0310991 A1 | 10/2014 | Greene et al. | |
| 2015/0272271 A1 | 10/2015 | Campos, II et al. | |

FOREIGN PATENT DOCUMENTS

| | | |
|---|---|---|
| CN | 104507342 A | 4/2015 |
| EP | 0714613 A2 | 6/1996 |
| EP | 0876113 B1 | 7/2003 |
| WO | 9809546 A1 | 3/1998 |
| WO | 0119211 A1 | 3/2001 |

\* cited by examiner

SOLE STRUCTURE FOR AN ARTICLE OF FOOTWEAR HAVING A BLADDER ELEMENT WITH LATERALLY EXTENDING TUBES AND METHOD OF MANUFACTURING A SOLE STRUCTURE

CROSS-REFERENCE TO RELATED APPLICATION

This application claims the benefit of and is a National Stage entry of International Patent Application No. PCT/US2016/060066, filed Nov. 2, 2016, which claims the benefit under 35 U.S.C. 119(e) of priority to U.S. Provisional Application No. 62/250,216, filed Nov. 3, 2015, which is incorporated by reference in its entirety.

TECHNICAL FIELD

The present teachings generally include an article of footwear with a sole structure having a bladder element, and a method of manufacturing a sole structure of an article of footwear.

BACKGROUND

Footwear typically includes a sole configured to be located under a wearer's foot to space the foot away from the ground or floor surface. Athletic footwear in particular sometimes utilizes polyurethane foam or other resilient materials in the sole to provide cushioning. Fluid-filled bladders are sometimes included in the sole to provide desired impact force absorption, motion control, and resiliency.

DESCRIPTION

Figure 1:
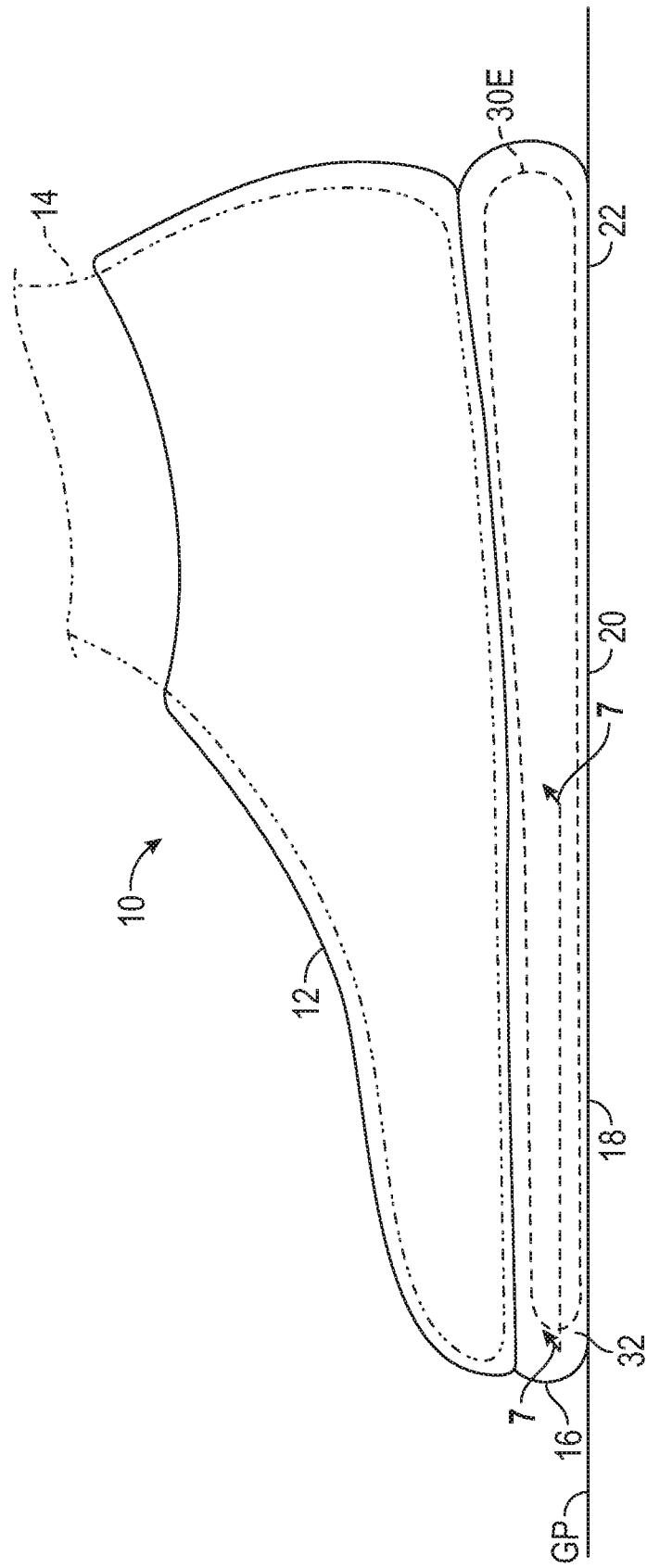
FIG. 1 is a schematic illustration in side view of an article of footwear having a sole structure and showing a bladder element with hidden lines.

An article of footwear is disclosed that includes a sole structure having a bladder element. The bladder element includes multiple fluid-filled tubes that are substantially decoupled from one another along their respective lengths. The tubes extend lengthwise at least partially from a lateral side of the sole structure to a medial side of the sole structure. As used herein, adjacent tubes are "substantially decoupled" from one another if they are disconnected from one another along more than fifty percent of their lengths.

At least some of the tubes may be in a forefoot portion of the sole structure. For example, in one embodiment, the tubes in the forefoot portion include a first tube and a second tube. The first tube is positioned entirely between a medial extremity of the sole structure and the second tube, and the second tube is positioned entirely between a lateral extremity of the sole structure and the first tube. An end portion of the first tube disposed furthest from the medial extremity is aligned with an end portion of the second tube disposed furthest from the lateral extremity. In such an arrangement, increased lateral flexibility is achieved as the bladder element can flex between the first and the second tubes, such as at a longitudinal midline of the sole structure.

Optionally, the tubes in the forefoot portion may further include a third tube and a fourth tube. The third tube is positioned entirely between the medial extremity of the sole structure and the fourth tube, and the fourth tube disposed entirely between the lateral extremity of the sole structure and the third tube. An end portion of the third tube disposed furthest from the medial extremity is aligned with an end portion of the fourth tube disposed furthest from the lateral extremity.

In another embodiment, the tubes in the forefoot portion may include a first tube that extends generally transversely across the longitudinal midline of the sole structure, and a second tube that extends generally transversely across the longitudinal midline of the sole structure. The second tube is spaced rearward of the first tube. In either embodiment, the tubes are substantially decoupled from one another along their lengths. Adjacent tubes may be indirectly connected to one another along their lengths by a channel that establishes fluid communication, but the outer surfaces of adjacent ones of the tubes are not directly connected to one another, nor are they indirectly connected to one another by webbing formed from the material used to form the tubes. Decoupling of the tubes in this manner allows at least some of the outer surfaces of the tubes to be surrounded by or encased in foam in some embodiments. Gaps between the lengths of the tubes may be filled with the foam. The foam allows for increased fore-aft flexibility of the sole structure, while the tubes provide enhanced stability with lateral movement.

The bladder element may include channels that connect adjacent ones of the tubes along a portion of their lengths to establish fluid communication between the tubes. The bladder element may further include an inflation port disposed at a periphery of the bladder element and in fluid communication with the adjacent ones of the tubes via the channels. In one embodiment, the channels further connect the tubes of the forefoot portion with additional tubes of the bladder element in the midfoot portion and in the heel portion of the bladder element. For example, in one embodiment, a first of the channels connects one of the tubes in a forefoot portion of the sole structure to one of the tubes in a midfoot portion of the sole structure, and a second of the channels is connected to one of the tubes in a heel portion of the sole structure. In such an embodiment, when the first and the second channels are sealed, the heel portion, the midfoot portion, and the forefoot portion of the sole structure can have different inflated pressures.

In another embodiment, the tubes and channels are only in the forefoot portion, and the sole structure further includes a fluid-filled chamber in a midfoot portion of the sole assembly that is isolated from fluid communication with the bladder element. The sole structure may further include a generally longitudinally-extending fluid-filled chamber positioned nearer to the medial extremity of the sole structure than the lateral extremity of the sole structure and isolated from fluid communication with the tubes The bladder element may further include sub-chambers. Each of the sub-chambers extends along one of either the lateral extremity or the medial extremity of the sole structure, connecting end portions of adjacent ones of the tubes and establishing fluid communication at the end portions between the adjacent ones of the tubes.

In an arrangement of the bladder element with the tubes as described, a gap is provided between adjacent ones of the tubes, and the gap extends from a medial extremity to a lateral extremity of the sole structure. For example, adjacent ones of the sub-chambers extending along one of the medial extremity and the lateral extremity of the sole structure are decoupled from one another so that the gap extends from the lateral extremity to the medial extremity between the decoupled sub-chambers and between the tubes. The sub-chambers may extend along the lateral extremity or the medial extremity beyond the outer surfaces of the adjacent tubes so that the gap is narrower between the sub-chambers than between the tubes. Accordingly, the peripheral support provided by the bladder element, and the exposure of the bladder element in profile along the medial extremity and the lateral extremity is maximized.

In one embodiment, the tubes include a first pair of tubes connected by a first of the sub-chambers, and a second pair of tubes rearward of the first pair and connected by a second of the sub-chambers. The tubes may further include a third pair of tubes rearward of the second pair and connected by a third of the sub-chambers. The gap may extend from the lateral extremity of the sole structure to the medial extremity of the sole structure between the first and the second pairs of tubes, and between the first sub-chamber and the second sub-chamber. An additional gap may be provided between the second and the third pairs of tubes, and may extend from the lateral extremity of the sole structure to the medial extremity of the sole structure. By configuring the tubes substantially decoupled from one another along their lengths as described, the gaps contain no bladder material, and can be filled with foam that surrounds outer surfaces of the tubes. The foam-filled gaps function as flexion regions, affording fore-aft flexibility, while lateral support is provided by the generally stiffer fluid-filled tubes of the bladder element.

The tubes are positioned only where cushioning is desirable. The bladder element is absent from some regions between the lateral side and the medial side, as no webbing is in those regions or between the lengths of adjacent tubes. Less material is thus required to manufacture the bladder element in comparison to a bladder element with webbing. Additionally, the elongated shape of the tubes, especially where arranged such that adjacent pairs of the tubes are connected at their ends by sub-chambers, provides a large area of cushioning with a relatively low height.

A method of manufacturing a sole structure of an article of footwear includes forming a bladder element with multiple tubes substantially decoupled from one another along their respective lengths. The method includes positioning the bladder element so that the tubes extend lengthwise at least partially from a lateral extremity of the sole structure to a medial extremity of the sole structure.

The bladder element may be formed by a variety of methods, including blow-molding and thermoforming. Forming the bladder element may include forming channels connecting adjacent ones of the tubes along a portion of their lengths to establish fluid communication between the adjacent ones of the tubes, and forming an inflation port disposed at a periphery of the bladder element and in fluid communication with the adjacent ones of the tubes via the channels.

The method may include sequential inflation of the bladder element to achieve multiple inflation pressures in different portions of the bladder element. For example, the method may include inflating the bladder element through the inflation port to a first inflation pressure, and then closing one of the channels to form a sealed first tube portion of the bladder element, with the first inflation pressure retained in the sealed first tube portion. The method may further include inflating a first remaining unsealed portion of the bladder element through the inflation port to a second inflation pressure, and closing another of the channels to form a sealed second tube portion of the bladder element. Next, the method may include inflating a second remaining unsealed portion of the bladder element through the inflation portion to a third inflation pressure. Different inflation pressures are thus established in different ones of the tubes separated from one another by the closed channels. For example, the sole structure may have a forefoot portion, a midfoot portion, and a heel portion. The sequential inflation may performed so that at least one of the tubes in the heel portion has the first inflation pressure, at least one of the tubes in the midfoot portion has the second inflation pressure, and at least one of the tubes in the forefoot portion has the third inflation pressure.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Referring to the drawings wherein like reference numbers refer to like components throughout the several views, FIG. 1 shows an article of footwear 10 in a lateral side view. As shown, the article of footwear 10 is an athletic shoe. In other embodiments, the article of footwear 10 could be for another category of footwear, such as a dress shoe, a work shoe, a sandal, a slipper, or a boot.

The article of footwear 10 includes an upper 12 configured with a cavity that receives a foot 14 of a wearer. The upper 12 can be a variety of flexible materials such as textiles, and fabrics, and may include plastic support components. The upper 12 may be multiple pieces sewn, knitted, or bonded to one another. The upper 12 may include a lacing system or may be a slip-on sock. The upper 12 may further include support elements, such as a heel counter. The upper 12 is shown worn on a foot 14 shown in phantom.

The article of footwear 10 includes a sole structure 16 operatively secured to the upper 12 and providing cushioning between the foot 14 and the ground GP. The article of footwear 10 and the sole structure 16 have a forefoot portion 18, a midfoot portion 20, and a heel portion 22. The forefoot portion 18 generally includes portions of the sole structure 16 corresponding with the toes and the joints connecting the metatarsals with the phalanges of the foot 14. The midfoot portion 20 generally corresponds with an arch area of the foot 14, and extends from the forefoot portion 18 to a heel portion 22. The heel portion 22 generally corresponds with rear portions of a human wearer's foot 14, including the calcaneus bone, with the foot 14 corresponding in size to the article of footwear 10. The heel portion 22 is defined as approximately the rear third of the sole structure 16. The midfoot portion 20 is defined as the middle third of sole structure 16. The forefoot portion 18 is defined as the front third of the sole structure 16. A perimeter P of the sole structure 16 surrounds the forefoot portion 18, the midfoot portion 20, and the heel portion 22. The article of footwear 10 shown is for a left foot. A pair of footwear includes the article of footwear 10, and an article of footwear for a right foot that is a mirror image of the article of footwear 10.

Figure 2:
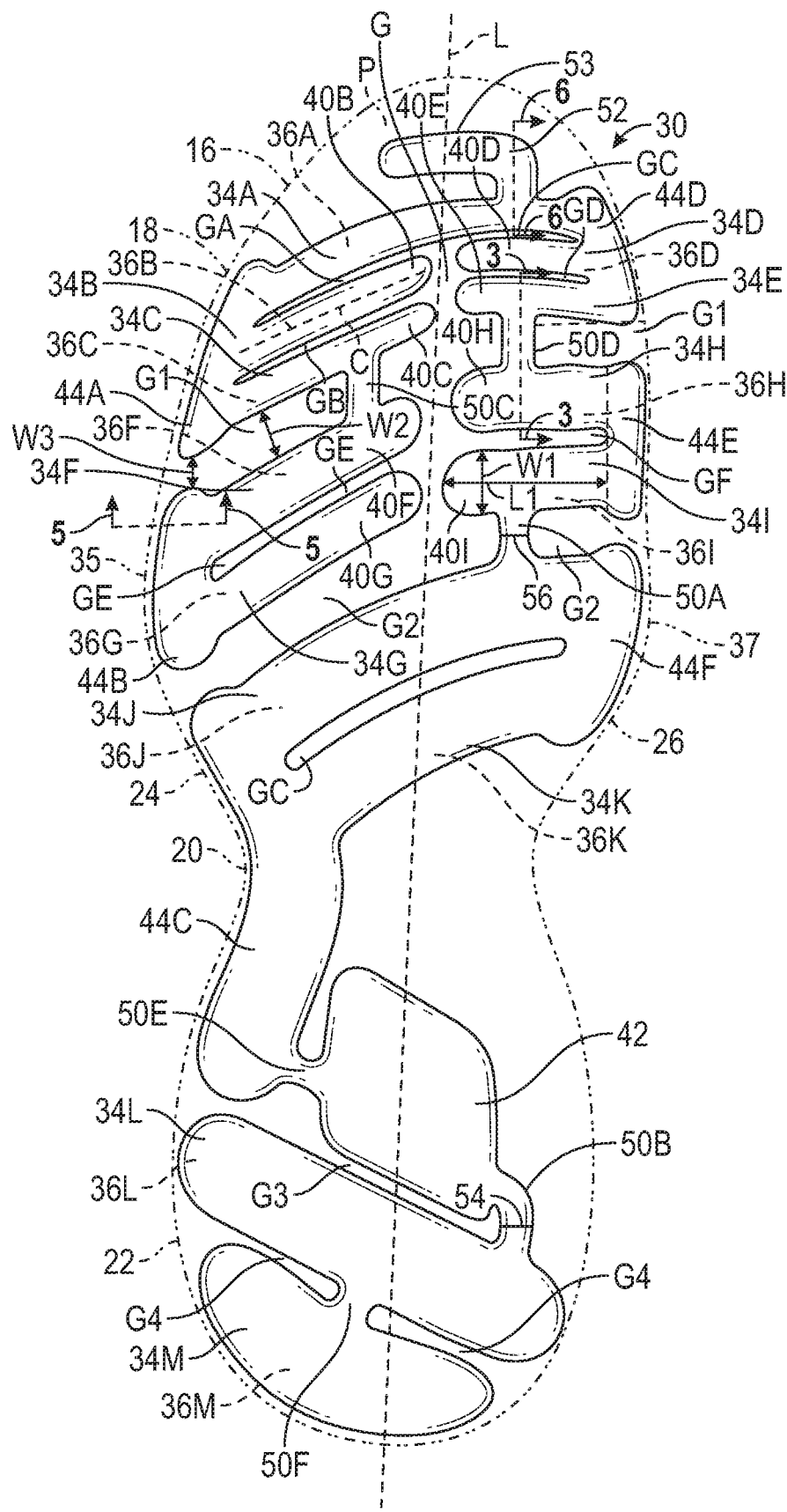
FIG. 2 is a schematic illustration in plan view of the bladder element of FIG. 1 showing a perimeter of the sole structure in phantom.

The sole structure 16 has a lateral side 24 best shown in FIG. 1, and a medial side 26 best shown in FIG. 2. The lateral side 24 includes all portions of the sole structure 16 on a side of a longitudinal midline L closest to a lateral side of the foot 14. The medial side 26 includes all portions of the sole structure 16 on a side of the longitudinal midline L closest to a medial side of the foot 14. The lateral side 24 of the sole structure 16 is a side that corresponds with the side of the foot 14 that is generally further from the other foot of the wearer (i.e., the side closer to the fifth toe of the wearer). The fifth toe is commonly referred to as the little toe. The medial side 26 of the sole structure 16 is the side that corresponds with an inside area of the foot 14 and is generally closer to the other foot of the wearer (i.e., the side closer to the hallux of the foot of the wearer). The hallux is commonly referred to as the big toe.

The sole structure 16 includes a fluid-filled bladder element 30 shown and discussed in further detail with respect to FIG. 2. In FIG. 1, the sole structure 16 also includes foam 32 that covers at least some of the outer surfaces of the bladder element 30. For example, the foam 32 may be but is not limited to ethylene vinyl acetate (EVA) foam or polyurethane foam. In addition to foam 32, the sole structure 16 may include an outsole or discreet outsole elements (not shown) between the foam 32 and the ground GP. For example, the outsole or outsole elements may be rubber or another relatively durable material for providing traction and grip. Alternatively, the foam 32 may serve as a unitary midsole and outsole. The sole structure 16 may also include various support elements, such as one or more plates that may also be encased in the foam 32. Still further, no foam may be used. For example, the bladder element 30 could instead be directly attached to the upper 12, or a midsole layer could be attached to the upper 12 and the bladder element 30 could be attached to a ground-facing side of the midsole layer. Outsole elements may be attached to or made integral with the bladder element 30 in such an embodiment.

The bladder element 30 is a polymeric material capable of retaining a pressurized fluid. For example, the bladder element 30 may comprise a thermoplastic polyurethane material (TPU). Optionally the TPU may be recyclable and regrindable, and may be made from recycled TPU, allowing the material of the bladder element 30 to be recycled and reused.

The bladder element 30 may be blow-molded or alternatively may be thermoformed from upper and lower sheets. The sheets may have alternating layers of TPU and a gas barrier material. In any embodiment, the bladder element 30 is configured to retain fluid within the fluid-filled chambers. As used herein, a "fluid" includes a gas, including air, an inert gas such as nitrogen, or another gas. Accordingly, "fluid-filled" includes "gas-filled". The various materials used for the bladder element 30 may be substantially transparent or may have a tinted color. For example, the bladder element 30 can be formed from any of various polymeric materials that can retain a fluid at a predetermined pressure, including a fluid that is a gas, such as air, nitrogen, or another gas. For example, the bladder element 30 can be a TPU material, a urethane, polyurethane, polyester, polyester polyurethane, and/or polyether polyurethane.

Moreover, in one embodiment, the bladder element 30 can be formed of one or more sheets having layers of different materials. The sheets may be laminate membranes formed from thin films having one or more first layers that comprise thermoplastic polyurethane layers and that alternate with one or more second layers, also referred to herein as barrier layers, gas barrier polymers, or gas barrier layers. The second layers may comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. The first layer may be arranged to form an outer surface of the polymeric sheet. That is, the outermost first layer may be the outer surface of the bladder element 30. The bladder element 30 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 30 may also be a flexible microlayer membrane that includes alternating layers of a gas barrier polymer material such as second layers and an elastomeric material such as first layers, as disclosed in U.S. Pat. Nos. 6,082,025 and 6,127,026 to Bonk et al.

which are incorporated by reference in their entireties. With such alternating layers, for example, the bladder element 30 or any of the additional bladder elements discussed herein may have a gas transmission rate for nitrogen of less than 10 cubic centimeters per square meter per atmosphere per day, or of less than 1 cubic centimeter per square meter per atmosphere per day. Additional suitable materials for the bladder element 30 are disclosed in U.S. Pat. Nos. 4,183,156 and 4,219,945 to Rudy which are incorporated by reference in their entireties. Further suitable materials for the bladder element 30 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder element 30, engineering properties such as tensile strength, stretch properties, fatigue characteristics, dynamic modulus, and loss tangent can be considered. When the bladder element 30 is formed from sheets, the thicknesses of the sheets used to form the bladder element 30 can be selected to provide these characteristics.

The bladder element 30 includes multiple fluid-filled tubes. More specifically, the bladder element 30 includes tubes 34A, 34B, 34C, 34D, 34E, 34F, 34G, 34H, 34I, 34J, 34K, 34L, 34M. When referring to the tubes in general herein, the tubes are referenced as 34. As used herein, a "tube" is an elongated hollow member with a length greater than its width. In the embodiment shown, the length of each tube is at least twice as great as its width. For example, as shown even with respect to one of the tubes 34I having the smallest length to width ratio, the length L1 is more than twice as great as the width W1. In cross-section, the tubes 34 shown herein are generally annular. For example, in the cross-sectional views of FIGS. 3 and 4, the tubes 34E, 34H, and 34L are generally annular. Alternatively, the tubes may be oval in cross-section, may be square or rectangular in cross-section, or may have another closed shape in cross-section.

Figure 3:
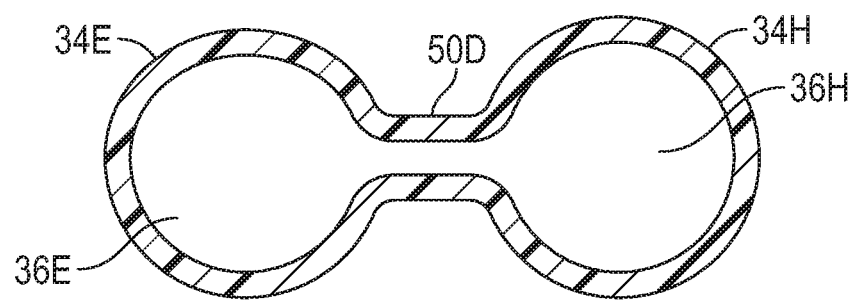
FIG. 3 is a schematic cross-sectional illustration of the bladder element of FIG. 2 taken at lines 3-3 in FIG. 2.
Figure 4:
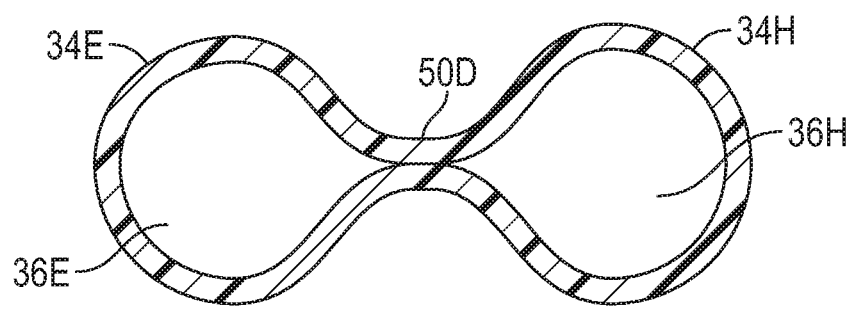
FIG. 4 is a schematic cross-sectional illustration of the bladder element of FIG. 2 taken at the same cross-section as in FIG. 3, but with a connecting channel sealed.
Figure 7:
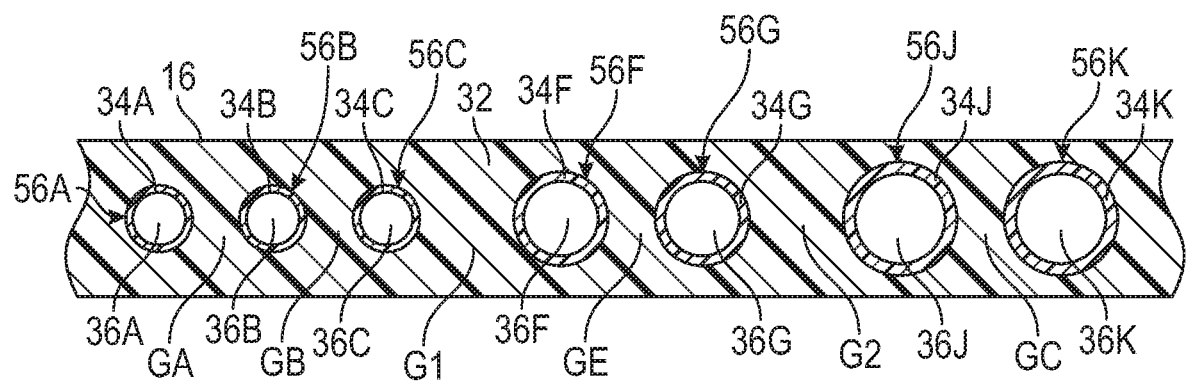
FIG. 7 is a schematic cross-sectional illustration of the sole structure of FIG. 1 taken at lines 7-7 in FIG. 1.

The tubes 34 extend lengthwise at least partially from a lateral extremity 35 of the sole structure 16 to a medial extremity 37 of the sole structure 16. Each of the tubes 34 has an internal cavity that can be inflated with fluid. FIG. 3 shows internal cavities 36E and 36H of tubes 34E and 34H in fluid communication through channel 50A. FIG. 4 shows the channel 50A sealed, so that the internal cavities 36E, 36H are not in communication with one another through the channel 50A. FIG. 7 shows internal cavities 36A, 36B, 36F, 36G, 36J, and 36K of tubes 34A, 34B, 34F, 34G, 34J, and 34K. As discussed herein, the bladder element 30 is configured so that the internal cavities of all of the tubes 34 are in fluid communication with one another if none of the channels 50A, 50B, 50C and 50D are sealed. Tubes 34C, 34D, 34I, 34L, and 34M also have internal cavities 36C, 36D, 36I, 36L, and 36M, indicated with phantom lines in FIG. 2.

The fluid-filled tubes 34 are substantially decoupled from one another along their lengths. In other words, adjacent tubes are disconnected from one another along more than fifty percent of their lengths. Moreover, the outer surface of a tube 34 is not connected to the outer surface of an adjacent tube 34 along its length either directly or by webbing. As discussed herein, adjacent tubes 34 are connected along their lengths only indirectly by channels, such as channels 50A, 50B, 50C, and 50D. Bladder elements typically have webbing between inflated portions. Webbing is uninflated portions of polymeric material used to form a bladder element, such as sheet material. In the bladder element 30, however, gaps are provided between the lengths of each adjacent tube 34. Moreover, the bladder element 30 is absent from a majority of the medial side 26 of the midfoot portion 20. The arrangement of the tubes 34 in the bladder element 30 provides cushioning support where needed under the foot 14, while the polymeric material is absent from other areas in order to minimize material waste and enhance flexibility as discussed herein.

The tubes 34A, 34B, 34C, 34D, 34E, 34F, 34G, and 34H are in the forefoot portion 18 of the sole structure 16. The tubes 34J and 34K are in the midfoot portion 20 of the sole structure 16. The tubes 34L and 34M are in the heel portion 22 of the sole structure 16. The tubes 34 in the forefoot portion 18 include a first tube 34D and a second tube 34B. The first tube 34D is positioned entirely between the medial extremity 37 of the sole structure 16 and the second tube 34B. The second tube 34B is positioned entirely between the lateral extremity 35 of the sole structure 16 and the first tube 34D. The first tube 34D is positioned entirely between the medial extremity 37 and the longitudinal midline L of the sole structure 16. The second tube 34B is positioned entirely between the lateral extremity 35 of the sole structure 16 and the longitudinal midline L.

Moreover, a first end portion 40D of the first tube 34D disposed furthest from the medial extremity 37 is aligned with a second end portion 40B of the second tube 34B disposed furthest from the lateral extremity 35. In other words, the end portions 40D, 40B of the first tube 34D and the second tube 34B nearest the longitudinal midline L are aligned. As used herein, end portions of tubes, such as end portions 40B, 40D of tubes 34B, 34D, are "aligned" if a line or arc extending over the longitudinal midline L and coincident with a center axis of one of the tubes intersects the end portion of the other one of the tubes. As shown in FIG. 2, a center axis C of the second tube 34B intersects the first end portion 40D of the first tube 34D. The end portions 40B, 40D are not connected to and are spaced from one another at a longitudinal gap G that extends generally along the longitudinal midline L.

The forefoot portion 18 further includes a third tube 34E and a fourth tube 34C. The third tube 34E is positioned entirely between the medial extremity 37 of the sole structure 16 and the fourth tube 34C, and is also entirely between the medial extremity 37 and the longitudinal midline L of the sole structure 16. The fourth tube 34C is positioned entirely between the lateral extremity 35 of the sole structure 16 and the third tube 34E, and is also entirely between the lateral extremity 35 and the longitudinal midline L of the sole structure 16. Moreover, a third end portion 40E of the third tube 34E disposed furthest from the medial extremity 37 is aligned with a fourth end portion 40C of the fourth tube 34C disposed furthest from the lateral extremity 35. In other words, the end portions 40E, 40C of the third tube 34E and the fourth tube 34C nearest the longitudinal midline L are aligned. The end portions 40E, 40C are not connected to and are spaced from one another at the longitudinal gap G.

The forefoot portion 18 further includes a third tube 34E and a fourth tube 34C. The third tube 34E is positioned entirely between the medial extremity 37 of the sole structure 16 and the fourth tube 34C, and is also entirely between the medial extremity 37 and the longitudinal midline L of the sole structure 16. The fourth tube 34C is positioned entirely between the lateral extremity 35 of the sole structure 16 and the third tube 34E, and is also entirely between the lateral extremity 35 and the longitudinal midline L of the sole structure 16. Moreover, an end portion 40E of the third tube 34E disposed furthest from the medial extremity 37 is aligned with an end portion 40C of the fourth tube 34C disposed furthest from the lateral extremity 35. In other words, the end portions 40E, 40C of the third tube 34E and the fourth tube 34C nearest the longitudinal midline L are aligned. The end portions 40E, 40C are not connected to and are spaced from one another at the longitudinal gap G.

The forefoot portion 18 includes a fifth tube 34H and a sixth tube 34F. The fifth tube 34H is positioned entirely between the medial extremity 37 of the sole structure 16 and the sixth tube 34F. The sixth tube 34F is disposed entirely between the lateral extremity 35 of the sole structure 16 and the fifth tube 34H, and is also entirely between the lateral extremity and the longitudinal midline L. The fifth tube 34H is entirely between the medial extremity 37 and the longitudinal midline L, and the sixth tube 34F is entirely between the lateral extremity 35 and the longitudinal midline L. An end portion 40H of the fifth tube 34H disposed furthest from the medial extremity 37 is aligned with an end portion 40F of the sixth tube 34F disposed furthest from the lateral extremity 35. The end portions 40H, 40F are not connected to and are spaced from one another at the longitudinal gap G.

The forefoot portion 18 includes a seventh tube 34I that is disposed entirely between the medial extremity 37 and the longitudinal midline L. The forefoot portion 18 further includes an eighth tube 34G disposed entirely between the lateral extremity 35 and the longitudinal midline L. An end portion 40I of the seventh tube 34I disposed furthest from the medial extremity 37 is aligned with an end portion 40G of the eighth tube 34G disposed furthest from the lateral extremity 35. The end portions 40I, 40G are not connected to and are spaced from one another at the longitudinal gap G.

By separating the aligned end portions of the tubes at the longitudinal gap G, the forefoot portion 18 has greater flexibility in lateral movement than would a forefoot portion having longer or wider tubes that cross the longitudinal midline L. As configured, the bladder element 30 can flex along the longitudinal gap G. The volume between the adjacent ends of the tubes along the longitudinal gap G is filled with the foam 32 (not shown in FIG. 2). The foam 32 flexes more easily than the pressurized tubes 34, promoting flexing along the longitudinal gap G in the forefoot portion 18. Tube 34A in the forefoot portion 18 extends across the longitudinal midline L. However, tube 34A is the forwardmost tube, in an area near the ends of the toes that needs less lateral flexibility than under the ball of the foot 14.

The tubes 34J, 34K in the midfoot portion 20 and the tubes 34L, 34M in the heel portion 22 extend generally from the lateral side 24 to the medial side 26 and across the longitudinal midline L as less lateral flexing may be needed for general movement of the foot 14 in the midfoot and heel portions 20, 22 than in the forefoot portion 18 for the various activities for which the article of footwear 10 may be specifically intended, such as running or other athletic activities. The bladder element 30 is absent from the midfoot portion 20 between the longitudinal midline L and the medial extremity 37 as impact is concentrated in the forefoot and heel portions 18, 22. Additionally, the bladder element 30 includes a chamber 42 in the heel portion that has a generally trapezoidal shape and is generally centered over the longitudinal midline L. The chamber 42 together with the tubes 34L, 34M serve as a crash pad for reacting and distributing forces during a heel strike.

The bladder element 30 includes fluid-filled sub-chambers 44A, 44B, 44C, 44D, 44E, and 44F. The sub-chambers 44A, 44B, and 44C extend generally lengthwise along the lateral extremity 35 of the sole structure 16. The sub-chambers 44D, 44E, and 44F extend generally lengthwise along the medial extremity 37 of the sole structure 16. With this arrangement, the sub-chambers provide support generally along a periphery of the sole structure 16 in the forefoot portion 18 (i.e., along both the lateral extremity 35 and the medial extremity 37 in the forefoot portion 18), and along the periphery of the sole structure at the lateral extremity 35 in the midfoot portion 20.

When generally referring to all of the sub-chambers 44A, 44B, 44C, 44D, 44E, and 44F herein, the sub-chambers are referenced as 44. Each of the sub chambers 44 connects end portions of adjacent ones of the tubes 34. More specifically, the sub-chambers 44 connect the end portions of the tubes 34 that are furthest from the longitudinal midline L, and establish fluid communication between the connected tubes 34 at the end portions. The bladder element 30 includes six sub-chambers. Sub-chamber 44A connects end portion of tubes 34A, 34B, and 34C. Sub-chamber 44B connects end portions of tubes 34F and 34G. Sub-chamber 44C connects end portions of tubes 34J and 34K. Sub-chamber 44D connects end portions of tubes 34D, 34E. Sub-chamber 44E connects end portions of tubes 34H, 34I. Sub-chamber 44F connects end portions of tubes 34J, 34K. Additionally, each of the sub-chambers 44A, 44B, 44C, 44D, 44E, and 44F extends along the lateral extremity 35 or along the medial extremity 37 further than the tubes 34 connected by the respective sub-chamber 44A, 44B, 44C, 44D, 44E, and 44F.

Adjacent ones of the sub-chambers 44 extending along the medial extremity 37 or the lateral extremity 35 are decoupled from one another so that a gap extends from the lateral extremity 35 to the medial extremity 37 between the decoupled sub-chambers 44 and between the tubes 34. For example, a gap G1 extends between the sub-chambers 44A, 44B, between the tubes 34C, 34F, between the tubes 34E, 34H, and between the sub-chambers 44D, 44E. The gap G1 is traversed only by the channels 50C, 50D discussed herein. The channels 50C, 50D are relatively narrow in width in comparison to the tubes 34, and extend generally longitudinally between adjacent ones of the tubes 34. Accordingly, the channels 50C, 50D do not significantly diminish flexibility in the fore-aft direction at the gap G1.

The gap G1 is narrower between the adjacent sub-chambers 44A, 44B than between the adjacent tubes 34C, 34F. Specifically, the gap G1 has a width W2 between the tubes 34C, 34F, and a much smaller width W3 between the adjacent sub-chambers 44A, 44B. The gap G1 is narrowed between the sub-chambers 44A, 44B because the sub-chambers 44A, 44B extend along the lateral extremity 35 beyond the tubes 34 connected by the sub-chambers 44A, 44B. Similarly, the gap G1 is narrower between the adjacent sub-chambers 44D, 44E than between the adjacent tubes 34E, 34H. By extending the sub-chambers 44A, 44B, 44D, 44E in this manner to narrow the gap G1, additional peripheral support is provided by the sub-chambers 44A, 44B, 44D, 44E of the bladder element 30, and more of the bladder element 30 is visible in a side view of the sole structure 16 in an embodiment in which the sub-chambers 44 are not covered by foam or other material on their side-facing outer surfaces.

As shown in FIG. 2, the gap G1 is formed between adjacent pairs of the tubes and between adjacent pairs of the sub-chambers. The gap G1 extends from the medial extremity 37 to the lateral extremity 35 and is traversed only by the channels 50C, 50D. More specifically, a first pair of the tubes 34B, 34C is connected by a first of the sub-chambers 44A. Tube 34A is also connected to the pair of tubes 34B, 34C by the sub-chamber 44A. A second pair of the tubes 34F, 34G is rearward of the first pair of tubes 34B, 34C, and is connected by a second of the sub-chambers 44B. The first gap G1 extends from lateral extremity 35 to the medial extremity 37 of the sole structure 16 between tubes 34C and 34F (i.e., between the first pair of tubes 34B, 34C and the second pair of tubes 34F, 34G), and between the first sub-chamber 44A and the second sub-chamber 44B. The first gap G1 continues over the longitudinal midline L, and between tubes 34E and 34H (i.e., between the pair of tubes 34D, 34E and the pair of tubes 34H, 34I), and between the sub-chambers 44D, 44E.

An additional gap G2, referred to herein as a second gap, extends from the medial extremity 37 to the lateral extremity 35 between tubes 34G and 34J and is traversed only by the channel 50A. Tubes 34F and 34G are referred to herein as a second pair of tubes, and tubes 34J and 34K are referred to herein as a third pair of tubes. The second gap G2 also extends between sub-chambers 44B and 44C. The second gap G2 continues over the longitudinal midline L, and between tubes 34I and 34J (i.e., between the pair of tubes 34H, 34I and the pair of tubes 34J, 34K), and between the sub-chambers 44E, 44F. The channel 50A is relatively narrow in width in comparison to the tubes 34I, 34J, and extends generally longitudinally between the tubes 34I, 34J. Accordingly, the channel 50A does not significantly diminish flexibility in the fore-aft direction at the gap G2. The third pair of tubes 34J, 34K is rearward of the second pair of tubes 34F, 34G, and is connected by a third of the sub-chambers 44C.

The gap G2 is narrower between the adjacent sub-chambers 44B, 44C than between the adjacent tubes 34G, 34J because the sub-chambers 44B, 44C extend along the lateral extremity 35 beyond the tubes 34 connected by the sub-chambers 44A, 44B. Similarly, the gap G2 is narrower between the adjacent sub-chambers 44E, 44F than between the adjacent tubes 34I, 34J. By extending the sub-chambers 44B, 44C, 44E, 44F in this manner to narrow the gap G2, additional peripheral support is provided by the sub-chambers 44B, 44C, 44E, 44F of the bladder element 30, and more of the bladder element 30 is visible in a side view of the sole structure 16 in an embodiment in which the sub-chambers 44 are not covered by foam or other material on their side-facing outer surfaces.

The sole structure 16 also has gaps provided between tubes connected by a common sub-chamber. The gaps G1, G2 are wider than the gaps between tubes 34 that are connected to a common sub-chamber. Gap GA is between adjacent tubes 34A and 34B that are connected by sub-chamber 44A. Gap GB is between adjacent tubes 34B and 34C that are connected by sub-chamber 44A. Gap GC is between adjacent tubes 34A and 34D that are connected by sub-chamber 44D. Gap GD is between adjacent tubes 34D and 34E that are connected by sub-chamber 44D. Gap GE is between adjacent tubes 34F and 34G that are connected by sub-chamber 44B. Gap GF is between adjacent tubes 34H and 34I that are connected by sub-chamber 44E. Gap GC is between adjacent tubes 34J and 34K that are connected by sub-chamber 44F. As is apparent in FIG. 2, the gaps GA, GB, GC, GD, GE, GF, and GG between adjacent tubes 34 connected to a common sub-chamber 44 are smaller in width than the first and second gaps G1 and G2. In the embodiment shown, the gaps GA, GB, GC, GD, GE, GF, and GG are less than half the width of the adjacent tubes 34, while the gaps G1, G2 are more than half the width of the adjacent tubes 34.

A third gap G3 is formed between the first tube 34L of the heel portion 22 and the chamber 42. The third gap G3 extends from the medial extremity 37 of the sole structure 16 to the lateral extremity 35 of the sole structure 16 and is traversed only by the channel 50B. The channel 50B is relatively narrow in width in comparison to the tube 34L and the chamber 42, and extends generally longitudinally between the tube 34L and the chamber 42. Accordingly, the channel 50B does not significantly diminish flexibility in the fore-aft direction at the third gap G3.

A fourth gap G4 is formed between the first tube 34L of the heel portion 22 and a second tube 34M of the heel portion 22. The fourth gap G4 extends from the medial extremity 37 of the sole structure 16 to the lateral extremity 35 of the sole structure 16 and is traversed only by the channel 50F. The channel 50F is relatively narrow in width in comparison to the tubes 34L, 34M, and extends generally longitudinally between the tubes 34L, 34M. Accordingly, the channel 50F does not significantly diminish flexibility in the fore-aft direction at the fourth gap G4.

Accordingly, the gaps G1, G2, G3, and G4 serve as flexion regions for flexing of the sole structure 16 in the fore-aft direction. Any foam 32 that covers the outer surfaces of the tubes 34 and fills the gaps G1, G2, G3 has greater flexibility than the inflated bladder element 30. Gaps G1 and G2 are wider than gaps GA, GB, GC, GD, GE, GF, and GG to allow sufficient flexing ability at the gaps G1 and G2.

The bladder element 30 includes channels 50A, 50B, 50C, 50D, 50E, and 50F that connect adjacent ones of the tubes 34 along a portion of their lengths. When generally referring to all of the channels 50A, 50B, 50C, 50D, 50E, and 50F herein, the sub-chambers are referenced as 50. The channels 50 establish fluid communication between the adjacent tubes 34. In the embodiment of FIG. 2, the first channel 50A connects tube 34I to tube 34J. The second channel 50B connects tube 34L to the chamber 42. The third channel 50C connects tube 34C to tube 34F. The fourth channel 50D connects tube 34E to tube 34H. A fifth channel 50E connects the chamber 42 to the sub-chamber 44C. The sixth channel 50F connects tube 34L to tube 34M.

The bladder element 30 includes an inflation port 52 that is disposed at a forward-most periphery 53 of the bladder element 30. Alternatively, the inflation port 52 could be provided at another location along the periphery of the bladder element 30, such as along the length of tube 34K in the relatively open midfoot portion 20. In the embodiment shown, the inflation port 52 is connected to the tube 34A and is in fluid communication with all of the tubes 34, all of the sub-chambers 44, and the chamber 42 via the channels 50 when the channels 50 are not sealed.

The channels 50 and the inflation port 52 are formed simultaneously with the tubes 34, the sub-chambers 44 and the chamber 42 by thermoforming or blow molding polymeric material to form the bladder element 30. Accordingly, the tubes 34, sub-chambers 44, chamber 42, channels 50, and inflation port 52 are of the same material. The inflation port 52 and the channels 50 are positioned and configured to enable the bladder element 30 to be inflated with and to retain different fluid pressures in different portions of the bladder element 30.

For example, the bladder element 30 may be inflated through the inflation port 52 initially to a first inflation pressure. Next the second channel 50B between the chamber 42 and the tube 34L can be closed such as by thermal bonding of the walls of the channel 50B together to create a weld 54. Closure of the channel 50B is indicated at weld 54. Closing the second channel 50B establishes a final first inflation pressure of the tubes 34L, 34M in the heel portion 22, referred to as the first sealed tube portion. Inflation fluid in the remainder of the bladder element 30 (i.e., all of the bladder element 30 between the inflation port 52 and the closed channel 50B, referred to as the first remaining unsealed portion) can be released through the inflation port 52, or can remain in the bladder element 30 as inflation continues. The first remaining unsealed portion of the bladder element 30 is then further inflated through the inflation port 52 to a final second inflation pressure. All portions of the bladder element 30 up to the weld 54 will thus be at the second inflation pressure. The first channel 50A between the tubes 34I and 34J can then be closed such as by thermal bonding of the walls of the channel 50A together to create a weld 56. Closure of the channel 50A is indicated at weld 56. Closing the channel 50A, such as by thermal bonding, establishes the final second inflation pressure of the tubes 34J, 34K, the sub-chambers 44C, 44F, and the chamber 42, referred to as the second sealed tube portion. Inflation fluid in the remainder of the bladder element 30 between the weld 56 and the inflation port 52 (referred to as the second remaining unsealed portion) can be released through the inflation port 52 or can remain in the bladder element 30 as inflation continues. The second remaining unsealed portion of the bladder element 30 can then be further inflated through the inflation port 52 to a final third inflation pressure. The inflation port 52 can then be closed, such as by thermal bonding of the walls of the inflation port 52 to one another. This establishes the third inflation pressure as the final inflation pressure of the tubes 34A, 34B, 34C, 34D, 34E, 34F, 34G, and 34I, and the sub-chambers 44A, 44B, 44D, and 44E. Alternatively, any or none of the channels 50A, 50B, 50C, and 50D can be closed depending on the desired final inflation pressures and desired ability for fluid communication within the bladder element 30, or one or more of the channels can be closed but the inflation pressures in the different portions separated by a closed channel can be the same, so that the effect of the closed channel is only to prevent fluid communication between the portions separated by the closed channel.

This sequential inflation of the bladder element 30 can be controlled as desired. In one example, the first inflation pressure of the tubes 34L, 34M in the heel portion 22 is greater than the second inflation pressure of the tubes 34J, 34K in the midfoot portion 20, which is greater than the third inflation pressure of the tubes 34A, 34B, 34C, 34D, 34E, 34F, 34G, 34H, and 34I in the forefoot portion 18. The first, second, and third inflation pressures may have other relative values. Optionally, additional ones of the channels 50C, 50D, 50E, or 50F can be closed to further vary inflation pressure.

A cross-sectional view of channel 50D as connecting adjacent ones of the tubes 34E, 34H along their lengths is shown in FIG. 3, illustrating fluid communication between the cavities 36E 36H of the tubes 34E, 34H via the channel 50D. FIG. 4 shows the channel 50D after closure, with the walls of the channel 50D thermally bonded to one another.

Figure 5:
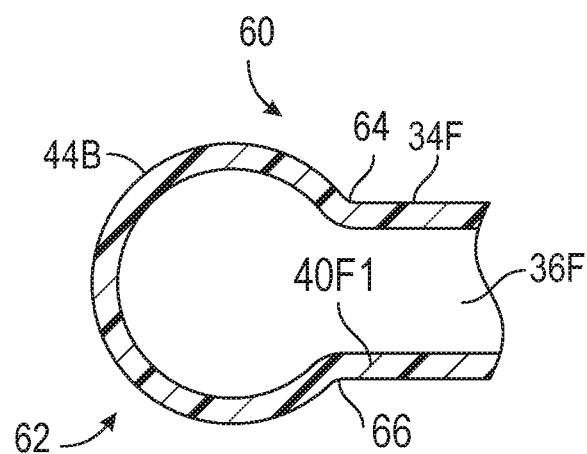
FIG. 5 is a schematic cross-sectional illustration of the bladder element of FIG. 2 taken at lines 5-5 in FIG. 2.

FIG. 5 shows a cross-sectional view of sub-chamber 44B connect to the tube 34F and in fluid communication with the cavity 36F. FIG. 5 illustrates that the sub-chambers 44, such as sub-chamber 44B, may be taller in profile than the tubes 34 to provide increased support at the periphery of the bladder element 30. The sub-chambers may be circular in a transverse cross-section, as shown in FIG. 5. The end portions connected to each sub-chamber extend generally from the middle of the cross-section. A first intersection is formed between each of the sub-chambers and the end portions connected thereto at the top side 60 of the bladder element as shown by first intersection 64 in FIG. 5 between the sub-chamber 44B and the end portion 40F1 of the tube 34F connected thereto. A second intersection is formed between each of the sub-chambers and the end portions connected thereto at the bottom side 62 of the bladder element as shown by second intersection 66 in FIG. 5. Accordingly, the taller sub-chamber 44B extends both higher than and lower than the end portions connected thereto, as shown by sub-chamber 44B extending higher than the end portion of tube 34F at the top side 60, and lower than the end portion of the tube 34F at the bottom side 62.

Figure 6:
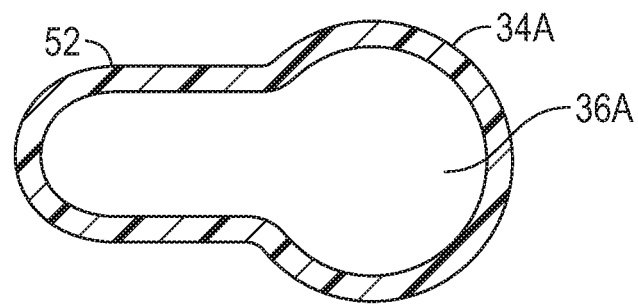
FIG. 6 is a schematic cross-sectional illustration of the bladder element of FIG. 2 taken at lines 6-6 in FIG. 2.

FIG. 6 shows a cross-sectional view of the inflation port 52 connected to tube 34A, illustrating fluid communication with the cavity 36A of the tube 34A through the inflation port 52. FIG. 7 shows a cross-sectional view of the forefoot portion 18 and the midfoot portion 20 of the sole structure, and showing the foam 32 covering outer surfaces 56A, 56B, 56C, 56F, 56G, 56J, and 56K of the tubes 34A, 34B, 34C, 34F, 34G, 34J, and 34K, and filling the gaps GA, GB, G1, GE, G2, and GC. The bladder element 30 may be bonded to the foam 32 by thermal bonding. For example, solid bead foam may be poured into a mold assembly around the bladder element 30, and the mold assembly may then be closed to compress the foam, and heated to cause thermal bonding. In other embodiments, foam does not encase the bladder element 30. For example, a foam layer may attached to a side of the bladder element facing the upper 12, and outsole elements can be attached to a ground-facing side of the bladder element 30.

Figure 8:
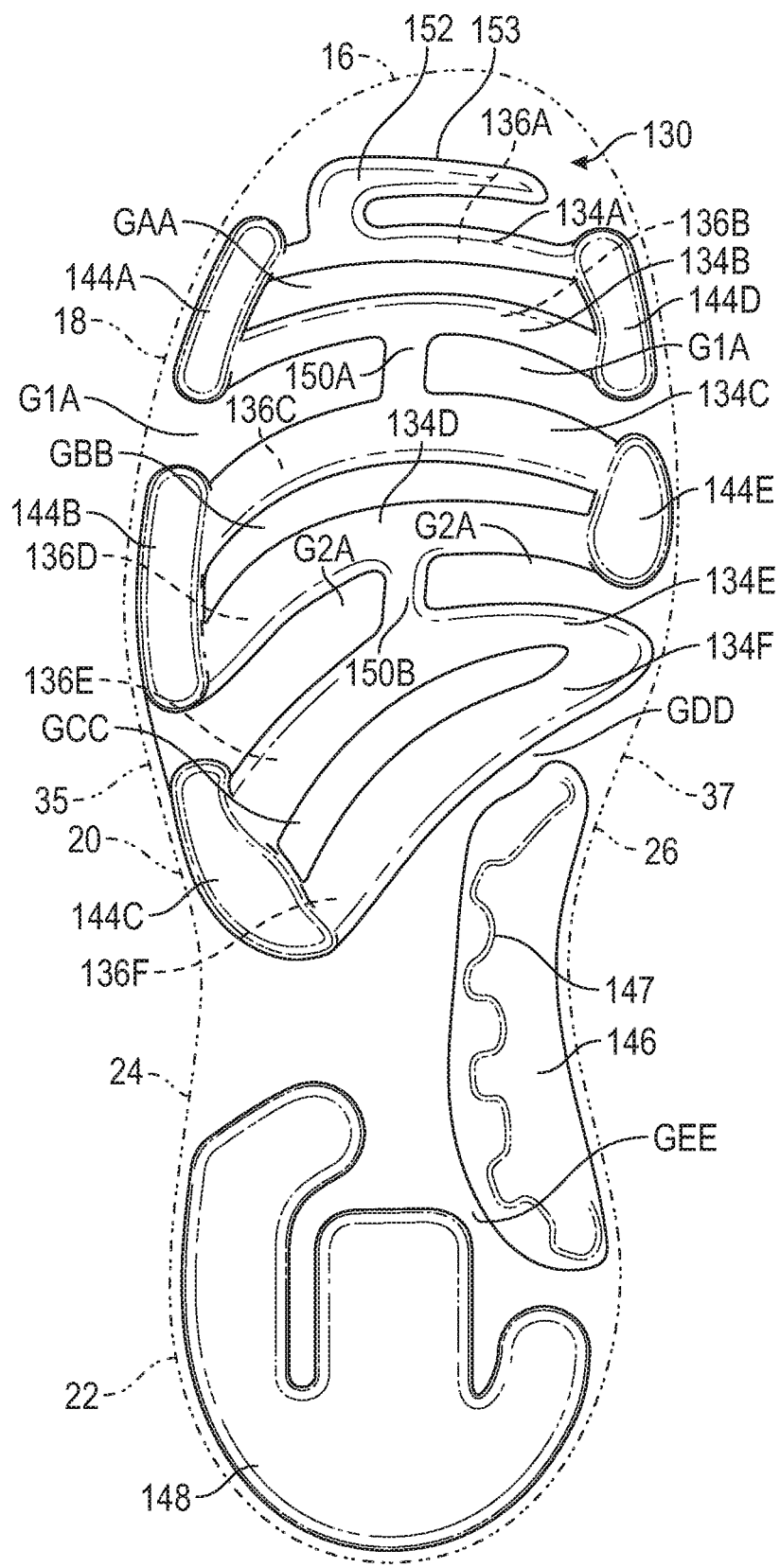
FIG. 8 is a schematic illustration in plan view of a bladder element for the sole structure of FIG. 1 in accordance with an alternative aspect of the present teachings.

FIG. 8 shows a second embodiment of the bladder element 130 for the sole structure 16 of FIG. 1. The bladder element 130 has many of the same features as described with respect to bladder element 30. The bladder element 130 includes multiple fluid-filled tubes 134A, 134B, 134C, 134D in the forefoot portion 18, and fluid-filled tubes 134E and 134F in the midfoot portion 20. The tubes 134A, 134B, 134C, 134D, 134E, and 134F are substantially decoupled from one another along their respective lengths. The internal cavities 136A, 136B, 136C, 136D, 136E, and 136F of the fluid-filled tubes 134A, 134B, 134C, 134D, 134E, and 134F are all in fluid communication with one another via sub-chambers 144A, 144B, 144C, 144D, and 144E, and channels 150A, 150B, and can be inflated through an inflation port 152 disposed at a forward periphery 153 of the bladder element 130, and connected to the tube 134A. The channel 150A connects adjacent tubes 134B, 134C along a portion of their lengths to establish fluid communication between the internal cavities 136B, 136C. The channel 150B connects adjacent tubes 134D, 134E along a portion of their lengths to establish fluid communication between the internal cavities 136D, 136E.

The sub-chambers 144A, 144B, and 144C extend generally lengthwise along the lateral extremity 35 of the sole structure 16. The sub-chambers 144D, 144E, and 144F extend generally lengthwise along the medial extremity 37 of the sole structure 16. With this arrangement, the sub-chambers 144A, 144B, 144C provide support generally along a periphery in the forefoot portion 18 on both the lateral side 24 and the medial side 26, and on the lateral side 24 of the midfoot portion 20. Sub-chamber 144A connects end portion of tubes 134A and 134B. Sub-chamber 144B connects end portions of tubes 134C and 134D. Sub-chamber 144C connects end portions of tubes 134E and 134F. Sub-chamber 144D connects end portions of tubes 134A, 134B. Sub-chamber 144E connects end portions of tubes 134C and 134D. The end portions of tubes 134E and 134F at the medial side 26 connect to one another without a distinct longitudinally-extending chamber. Similarly to the sub-chambers 44, the sub-chambers 144A, 144B, 144C, 144D, and 144E extend further along the lateral extremity 35 or the medial extremity 37 than the respective ones of the tubes 134A, 134B, 134C, 134D, 134E, and 134F that they connect.

Notable differences between the bladder element 30 and the bladder element 130 include that all of the tubes 134A, 134B, 134C, 134D in the forefoot portion 18 extend lengthwise at least partially from the lateral extremity 35 to the medial extremity 37 across the longitudinal midline L. Tube 134A is referred to herein as the first tube, and tube 134B is referred to herein as the second tube.

The tubes 134A, 134B, 134C, 134D, 134E, and 134F include a first pair of tubes 134A, 134B connected by a first of the sub-chambers 144A, a second pair of tubes 134C, 134D rearward of the first pair and connected by a second of the sub-chambers 144B. A third pair of tubes 134E, 134F is rearward of the second pair and connected by a third of the sub-chambers 144C.

The article of footwear having the bladder element 130 in lieu of the bladder element 30 may include a fluid-filled chamber 146 in the midfoot portion 20 of the sole structure 16. The fluid-filled chamber 146 is a generally longitudinally-extending fluid-filled chamber at the medial side 26 of the sole structure 16 and is isolated from fluid communication with the tubes 134A, 134B, 134C, 134D, 134E, and 134F as no channel connects the chamber 146 with any of the tubes 134A, 134B, 134C, 134D, 134E, and 134F. The chamber 146 has shaped formations 147 configured to provide desired arch support. Additionally, a fluid-filled chamber 148 in the heel portion 22 is isolated from fluid communication with the chamber 146 and from fluid communication with the tubes 134A, 134B, 134C, 134D, 134E, and 134F.

A first gap G1A extends from the lateral extremity 35 to the medial extremity 37 of the sole structure 16 between tube 134B and tube 134C (i.e., between the first and the second pairs of tubes), and between the first sub-chamber 144A and the second sub-chamber 144B. An additional gap, referred to herein as a second gap G2A, is provided between tube 134D and tube 134E (i.e., between the second and the third pairs of tubes) and extends from the lateral extremity 35 to the medial extremity 37 of the sole structure 16. Gaps of smaller widths extend between adjacent tubes of each pair. For example, gap GAA extends between tubes 134A, 134B. Gap GBB extends between tubes 134C, 134D. Gap GCC extends between tubes 134E, 134F. Moreover, a gap GDD extends between the tube 134F and the chamber 146. A gap GEE extends in the heel portion 22 between the sub-chamber 146 and the sub-chamber 148.

Adjacent ones of the tubes 134A, 134B, 134C, 134D, 134E, and 134F are substantially decoupled from one another along their lengths. In other words, the outer surface of a tube 134A is not directly connected to the outer surface of an adjacent tube 134B, nor are the outer surfaces connected by webbing of the bladder element 130. Similarly, the outer surface of tube 134B is not directly connected to the outer surface of tube 134C along its length, nor are the outer surfaces connected by webbing of the bladder element 130. The channel 150A indirectly connects the outer surfaces of tubes 134B and 134C. The arrangement of the tubes 134A, 134B, 134C, 134D, 134E, and 134F in the bladder element 130 as well as the arrangement of the chambers 146 and 148 provides cushioning support where needed under the foot 14, while the polymeric material is absent from other areas in order to minimize material waste and enhance flexibility as discussed herein.

All of the gaps G1A, G2A, GAA, GBB, GCC, GDD, and GEE may be filled with foam 32 which covers at least some of the outer surface of the bladder element 130, as well as the outer surfaces of the chamber 146 and the chamber 148. Alternatively, as discussed with respect to the bladder element 30, no foam may be used between the gaps. The gaps G1A and G2A allow fore-aft flexibility of the forefoot portion 18, the gap GDD allows flexibility of the forefoot portion 18 relative to the midfoot portion 20, and the gap GEE allows flexibility in the heel portion 22.

The bladder element 130 may be inflated through the inflation port so that all of the tubes 134A, 134B, 134C, 134D, 134E, and 134F and sub-chambers 144A, 144B, 144C, 144D, and 144E are at the same inflation pressure. Alternatively, a sequential inflation sequence may be used similar to that described with respect to the bladder element 30, with the channel 150B first closed, and then the channel 150A closed so that three different inflation pressures can be achieved in the bladder element 130. For example, the entire bladder element 130 may first be inflated to a first inflation pressure through the inflation port 152, and then the channel 150B may be closed by thermal bonding at a weld similar to weld 54 of FIG. 1 to establish a final first inflation pressure in a first sealed tube portion (i.e., in tubes 134E and 134F and sub-chamber 144C). The first remaining unsealed portion (i.e., all of the bladder element 130 between the inflation port 152 and the closed channel 150B) can then be inflated to a second inflation pressure. Optionally, the channel 150A can then be closed by thermal bonding at a weld similar to weld 56 of FIG. 1 to establish the second inflation pressure as the final inflation pressure in the second sealed tube portion (i.e., in the 134C and 134D, and the sub-chambers 144B, 144E). The second remaining unsealed portion (i.e., the tubes 134A, 134B, and the sub-chambers 144A, 144B) can then be inflated to a third inflation pressure. The inflation port 152 can then be closed to establish the third inflation pressure as the final inflation pressure in the tubes 134A, 134B, and the sub-chambers 144A, 144B. Alternatively, only the channel 150B can be closed, or only the channel 150A can be closed, depending on the desired final inflation pressures and desired ability for fluid communication within the bladder element 130. Separate inflation ports (not shown) are used to separately inflate the chamber 146 and the chamber 148, so that each of these can have different inflation pressures than the bladder element 130, if desired.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

What is claimed is:

1. An article of footwear comprising:
   a sole structure having a bladder element that includes multiple fluid-filled tubes substantially decoupled from one another with gaps extending between adjacent ones of the tubes along respective lengths of the adjacent ones of the tubes, and with an absence of any webbing of the bladder element in the gaps; wherein the tubes extend lengthwise at least partially from a lateral extremity of the sole structure to a medial extremity of the sole structure;
   wherein the bladder element further includes sub-chambers, wherein each of the sub-chambers extends along one of either the lateral extremity or the medial extremity of the sole structure and is connected to end portions of the adjacent ones of the tubes, establishing fluid communication at the end portions between the adjacent ones of the tubes;

wherein each of the sub-chambers is taller than the end portions of the adjacent ones of the tubes connected thereto such that a first intersection is formed between the sub-chamber and the end portions connected thereto at a top side of the bladder element, a second intersection is formed between the sub-chamber and the end portions connected thereto at a bottom side of the bladder element, and the sub-chamber extends higher than the end portions connected thereto at the top side, and lower than the end portions connected thereto at the bottom side; and wherein the bladder element includes channels connecting the adjacent ones of the tubes along a portion of the respective lengths of the adjacent ones of the tubes to establish fluid communication between the adjacent ones of the tubes.

2. The article of footwear of claim 1, wherein the bladder element includes an inflation port disposed at a periphery of the bladder element and in fluid communication with the adjacent ones of the tubes via the channels.

3. The article of footwear of claim 2, wherein:
a first of the channels connects one of the tubes in a forefoot portion of the sole structure to one of the tubes in a midfoot portion of the sole structure; and
a second of the channels is connected to one of the tubes in a heel portion of the sole structure, wherein:
the first and the second of the channels are sealed, and
the heel portion, the midfoot portion, and the forefoot portion of the sole structure have different inflated pressures.

4. The article of footwear of claim 1, wherein at least some of the tubes are in a forefoot portion of the sole structure.

5. The article of footwear of claim 4, wherein:
the tubes in the forefoot portion include a first tube and a second tube,
the first tube is positioned between the medial extremity of the sole structure and the second tube, and
the second tube is positioned between the lateral extremity of the sole structure and the first tube.

6. The article of footwear of claim 5, wherein a first end portion of the first tube disposed furthest from the medial extremity is aligned with a second end portion of the second tube disposed furthest from the lateral extremity.

7. The article of footwear of claim 6, wherein:
the tubes in the forefoot portion further include a third tube and a fourth tube;
the third tube is positioned between the medial extremity of the sole structure and the fourth tube;
the fourth tube is positioned between the lateral extremity of the sole structure and the third tube; and
a third end portion of the third tube disposed furthest from the medial extremity is aligned with a fourth end portion of the fourth tube disposed furthest from the lateral extremity.

8. The article of footwear of claim 7, wherein the first end portion of the first tube is separated from the second end portion of the second tube by a longitudinal gap, the third end portion of the third tube is separated from the fourth end portion of the fourth tube by the longitudinal gap, and the bladder element has an absence of any webbing connecting the first tube to the second tube across the longitudinal gap and an absence of any webbing connecting the third tube to the fourth tube across the longitudinal gap.

9. The article of footwear of claim 6, wherein the first end portion of the first tube is separate from the second end portion of the second tube by a longitudinal gap, and the bladder element has an absence of any webbing connecting the first tube to the second tube across the longitudinal gap.

10. The article of footwear of claim 5, wherein the tubes in the forefoot portion include:
a first tube that extends transversely across a longitudinal midline of the sole structure; and
a second tube that extends transversely across the longitudinal midline of the sole structure and is spaced rearward of the first tube.

11. The article of footwear of claim 1, further comprising:
a fluid-filled chamber in a midfoot portion of the sole structure and isolated from fluid communication with the bladder element.

12. The article of footwear of claim 1, further comprising:
a generally longitudinally-extending fluid-filled chamber positioned nearer to the medial extremity of the sole structure than the lateral extremity of the sole structure and isolated from fluid communication with the tubes.

13. The article of footwear of claim 1, wherein a first one of the gaps extends from the medial extremity to the lateral extremity of the sole structure.

14. The article of footwear of claim 13, wherein:
adjacent ones of the sub-chambers extending along one of the medial extremity and the lateral extremity of the sole structure are decoupled from one another by an absence of any webbing of the bladder element between the adjacent ones of the sub-chambers so that the first one of the gaps extends from the lateral extremity to the medial extremity between the decoupled sub-chambers and between the adjacent ones of the tubes; and
the first one of the gaps is narrower between the sub-chambers than between the adjacent ones of the tubes.

15. The article of footwear of claim 1, wherein the sole structure further includes foam surrounding outer surfaces of the tubes.

* * * * *

UNITED STATES PATENT AND TRADEMARK OFFICE
CERTIFICATE OF CORRECTION

PATENT NO. : 10,905,194 B2
APPLICATION NO. : 15/770666
DATED : February 2, 2021
INVENTOR(S) : Pamela S. Greene Page 1 of 1

It is certified that error appears in the above-identified patent and that said Letters Patent is hereby corrected as shown below:

In the Claims

Claim 10, Column 18, Line 20: "The article of footwear of claim 5, wherein the tubes". Should read --The article of footwear of claim 4, wherein the tubes--

Signed and Sealed this
Twenty-seventh Day of September, 2022

Katherine Kelly Vidal
*Director of the United States Patent and Trademark Office*